US007006092B2

(12) United States Patent
Guenther

(10) Patent No.: US 7,006,092 B2
(45) Date of Patent: Feb. 28, 2006

(54) METHOD AND APPARATUS FOR REPRESENTING COMPLEX VECTOR DATA

(75) Inventor: Mark L. Guenther, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 226 days.

(21) Appl. No.: 10/150,615

(22) Filed: May 16, 2002

(65) Prior Publication Data

US 2003/0214505 A1 Nov. 20, 2003

(51) Int. Cl.
*G09G 5/22* (2006.01)
*G06F 15/00* (2006.01)

(52) U.S. Cl. .................................. 345/440.1; 702/189
(58) Field of Classification Search ............... 345/440, 345/440.1; 702/66–74, 106, 107, 124–126, 702/176, 187, 189, 198; 324/76.12, 76.19, 324/76.52; 342/194, 188; 375/235, 279, 375/308, 329, 323
See application file for complete search history.

(56) References Cited

U.S. PATENT DOCUMENTS

| | | | | |
|---|---|---|---|---|
| 3,848,182 A | * | 11/1974 | Gerner et al. | 324/233 |
| 4,802,106 A | * | 1/1989 | Saito et al. | 345/440 |
| 4,816,767 A | * | 3/1989 | Cannon et al. | 324/76.19 |
| 4,818,931 A | * | 4/1989 | Naegeli et al. | 324/76.22 |
| 4,868,785 A | * | 9/1989 | Jordan et al. | 345/440 |
| 6,377,260 B1 | * | 4/2002 | Kuehnel | 345/440.1 |
| 6,532,024 B1 | * | 3/2003 | Everett et al. | 345/440 |

\* cited by examiner

*Primary Examiner*—Sumati Lef-Kowitz
*Assistant Examiner*—Chante Harrison
(74) *Attorney, Agent, or Firm*—Moser,Patterson,SheridanLLP; Thomas F. Lenihan; Francis I. Gray

(57) ABSTRACT

A method and apparatus for representing a complex vector signal by determining representative coordinates for the complex vector signal, wherein at least some of the determined representative coordinates are associated with corresponding reference coordinates; associating each of at least a portion of the determined representative coordinates and corresponding reference coordinates with at least one of a plurality of temporal spans; and selectively processing each of a plurality of temporal spans.

14 Claims, 5 Drawing Sheets

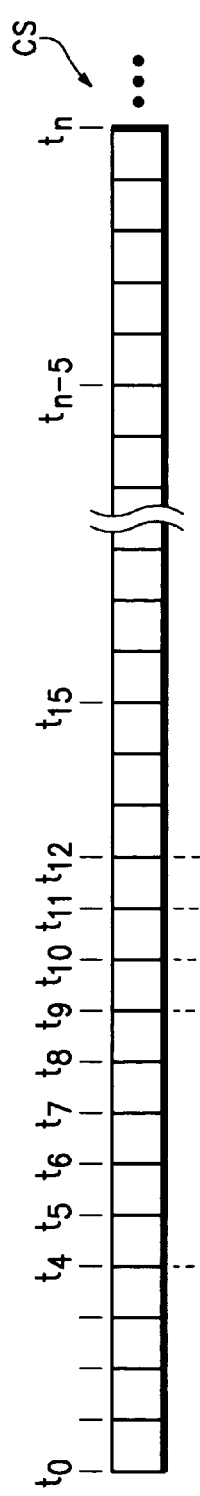
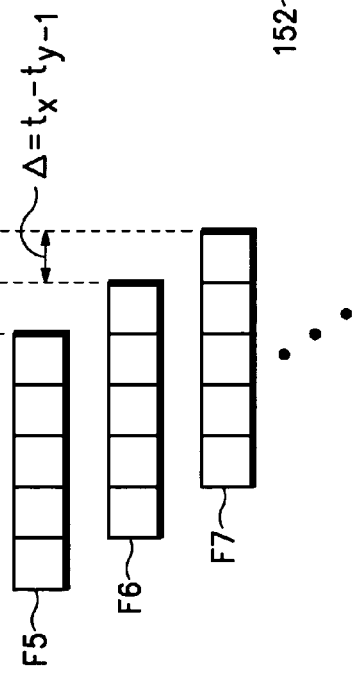
FIG.4
FIG.3

METHOD AND APPARATUS FOR REPRESENTING COMPLEX VECTOR DATA

TECHNICAL FIELD

The invention relates generally to signal analysis devices and, more specifically, to a method and apparatus for representing complex vector data.

BACKGROUND OF THE INVENTION

A common practice in the field of communication system analysis is to display a time-varying complex signal vector by plotting the real component and imaginary component parametrically as a function of time, as Cartesian coordinates on a plane. Such a display is frequently referred to as a polar display, independent of whether Cartesian or polar axes are used. For example, using a representative complex signal $S(t)=I(t)+j*Q(t)$, the values $I(t)$ and $Q(t)$ are both plotted parametrically against time.

Frequently it is of interest to simultaneously display a reference waveform for comparison to a measured waveform. For example, the reference waveform might be a mathematically synthesized waveform that is optimum according to some criteria. FIG. 1 graphically depicts a reference waveform denoted as R(t) that is graphically overlaid with a corresponding measured waveform denoted as S(t), where the independent variable t spans some range, say, $t_1 < t < t_2$. In this example, S(t) is shown as a solid line and R(t) is shown as a dashed line. While the diagram of FIG. 1 allows direct comparison of the measured waveform S(t) with the reference waveform R(t), this diagram is only useful if the time span, $t_2 - t_1$, is relatively short. This is because as the time span of the measured and corresponding reference waveforms increases, the diagram or display becomes too complex to be of practical use. Specifically, the signal or line density increases beyond a level at which a viewer may readily discern useful information. In such a case, the resulting display is useful only for gross qualitative assessment, since line density is so great that individual vector paths are hidden within nearly coincident segments of the same waveform. Further, in this case, the use of reference waveforms is almost pointless, since the corresponding increase in line density further compounds the problem of visually conveying useful information.

One method of utilizing a reference waveform within the context of a long time duration is to subtract the reference waveform from the measured waveform such that the magnitude of the resulting difference is displayed as a function of time. While such a waveform is useful in finding a point at which a maximum difference occurs, any correlation between the difference or errors and the position of the measured waveform in a complex plane is lost.

SUMMARY OF THE INVENTION

These and other deficiencies of the prior art are addressed by the present invention of a method and apparatus for representing complex vector signals or data. The invention advantageously allows very long records (i.e., vector data including corresponding reference vector data accumulated over a relatively long time period) to be viewed in a manner conveying to the viewer useful information.

A method for representing a complex vector signal according to one embodiment of the invention comprises determining representative coordinates for the complex vector signal, wherein at least some of the determined representative coordinates are associated with corresponding reference coordinates; associating each of at least a portion of the determined representative coordinates and corresponding reference coordinates with at least one of a plurality of temporal spans; and selectively processing each of a plurality of temporal spans.

BRIEF DESCRIPTION OF THE DRAWINGS

The teachings of the present invention can be readily understood by considering the following detailed description in conjunction with the accompanying drawings, in which:

FIG. 3 depicts a high-level block diagram of a controller suitable for use in the signal analysis system of FIG. 2;

FIG. 4 depicts a graphical representation of a temporal segmentation of a coordinate stream;

To facilitate understanding, identical reference numerals have been used, where possible, to designate identical elements that are common to the figures.

DETAILED DESCRIPTION OF THE INVENTION

The subject invention will be primarily described within the context of a measurement apparatus such as a digital storage oscilloscope (DSO) that receives at least one signal under test (SUT) that may be modeled as a complex vector that varies with time. It will be appreciated by those skilled in the art that the SUT, illustratively a communications signal having in-phase and quadrature components, may be a real signal having limited bandwidth when represented in the frequency domain, such that the signal takes on the interpretation of a complex signal when added to its Hilbert transform.

The SUT is processed to derive a corresponding stream of coordinates, where each coordinate is a complex number consisting of a real part and an imaginary part (corresponding to the in-phase and quadrature components, respectively). The stream of coordinates is divided into a plurality of segments, where each segment is associated with at least one coordinate. A plurality of logically sequential image frames is formed by associating each of a sequence of image frames with a respective plurality of contiguous segments. The frames are selectively displayed upon a display device to present, thereby, respective temporal portions of the stream of coordinates representing the signal under test. Optionally, coordinates derived from a reference signal may be associated with the initially generated stream of coordinates such that the displayed frame(s) also depicts the reference signal. It will be appreciated by those skilled in the art that the invention may be advantageously employed in any signal measurement, analysis or display device in which time varying vector signal processing is employed.

Figure 2:
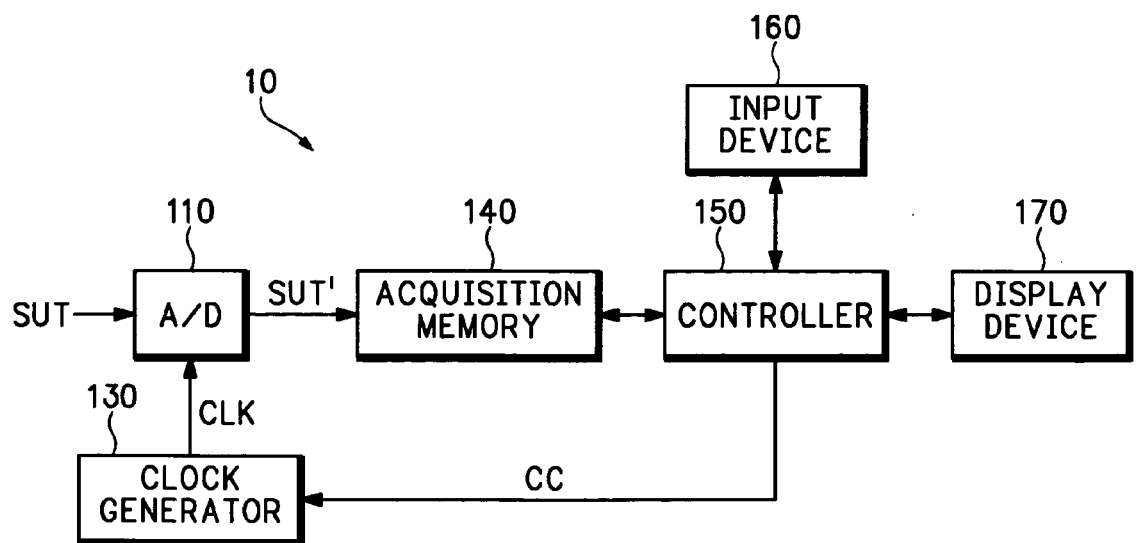
FIG. 2 depicts a high-level block diagram of a signal analysis system.

FIG. 2 depicts a high-level block diagram of a signal analysis device. Specifically, the signal analysis device 10 of FIG. 2 receives a signal under test (SUT) from an input probe (not shown) and responsively displays data generated using the SUT in the manner described below. The SUT comprises, illustratively, a quadrature amplitude modulation (QAM), phase shift keyed (PSK) or other complex vector signal utilizing, for example, a carrier signal having in-phase and quadrature phase components.

The signal analysis device 10 of FIG. 2 comprises an analog to digital (A/D) converter 110, a clock source 130, an acquisition memory 140, a controller 150, an input device 160 and a display device 170.

The A/D converter 110 receives and digitizes a signal under test (SUT) in response to a clock signal CLK produced by the clock source 130. The clock signal CLK is preferably a clock signal adapted to cause the A/D converter 110 to operate at a maximum sampling rate, though other sampling rates may be selected. The clock signal 130 is optionally responsive to a clock control signal CC produced by the controller 150 to change frequency and/or pulse width parameters associated with the clock signal CLK.

An output signals SUT' produced by the A/D converter 110 is stored in the acquisition memory 140. The acquisition memory 140 cooperates with the controller 150 to store data samples provided by the A/D converter 110 in a controlled manner such that samples from the A/D converter 110 may be provided to the controller 150 for further processing and/or analysis.

The controller 150 is used to manage the various operations of the signal analysis device 10. The controller 150 performs various processing and analysis operations on the data samples stored within the acquisition memory 140. The controller 150 receives user commands via an input device 160, illustratively a keypad or pointing device. An embodiment of the controller 150 will be described in more detail below with respect to FIG. 3.

The signal analysis device 10 of FIG. 2 is depicted as receiving only one signal under test (SUT). However, it will be appreciated by those skilled in the art that many signals under test may be received and processed by the signal analysis device 10. Each signal under test is preferably processed using a respective A/D converter 110, which A/D converter may be clocked using the clock signal CLK provided by clock source 130 or by another clock source. Additional memory may also be employed to support the processing of additional signals under test.

Figure 1:
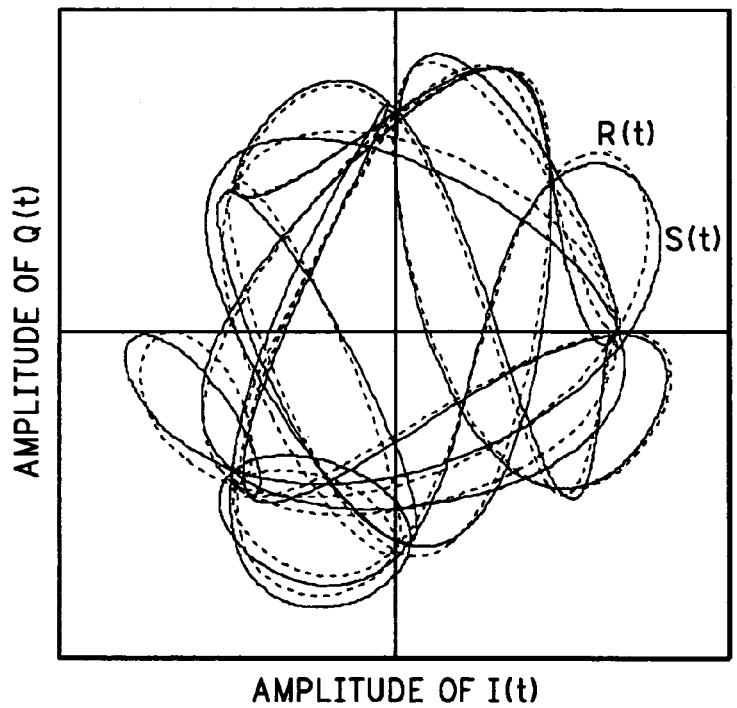
FIG. 1 graphically depicts a prior art polar display representation of a complex vector signal and a corresponding reference signal.

FIG. 3 depicts a high-level block diagram of a controller suitable for use in the signal analysis device 10 of FIG. 1. Specifically, the controller 150 of FIG. 3 comprises a processor 154 as well as memory 158 for storing various control programs 158-P. The processor 154 cooperates with conventional support circuitry 156 such as power supplies, clock circuits, cache memory and the like as well as circuits that assist in executing the software routines stored in the memory 158. As such, it is contemplated that some of the process steps discussed herein as software processes may be implemented within hardware, for example as circuitry that cooperates with the processor 154 to perform various steps. The controller 150 also contains input/output (I/O) circuitry 152 that forms an interface between the various functional elements communicating with the controller 150. For example, in the embodiment of FIG. 2, the controller 150 optionally communicates with the clock source 130 (via clock control signal CC). The controller 150 also communicates with the input device 160 via a signal path IN, a display device 170 via a signal path OUT and the acquisition memory 140 via a memory bus MB. The controller 150 may also communicate with additional functional elements (not shown). It is noted that the memory 158 of the controller 150 may be included within the acquisition memory 140, that the acquisition memory 140 may be included within the memory 158 of the controller 150 or that some portion of each may be shared.

Although the controller 150 of FIG. 3 is depicted as a general-purpose computer that is programmed to perform various control functions in accordance with the present invention, the invention can be implemented in hardware as, for example, an application specific integrated circuit (ASIC). As such, the process steps described herein are intended to be broadly interpreted as being equivalently performed by software, hardware or a combination thereof.

FIG. 4 depicts a graphical representation of a temporal segmentation of a coordinate stream. Specifically, FIG. 4 depicts a coordinate stream CS that has been temporally divided into a plurality of segments (delineated by respective time periods $t_0$, $t_1$ . . . $t_n$ . . . ). It is noted that the coordinate stream CS comprises the polar or Cartesian coordinates associated with a complex vector signal processed by, for example, the signal analysis device 10 of FIG. 1. Each of the time segments comprises at least one coordinate or set of coordinates. Preferably, each time segment comprises a plurality of coordinates, though the number of coordinates associated with each time segment is limited to avoid visual clutter during the subsequent display or presentation of the various coordinates, as will become clear with the following discussion.

FIG. 4 also depicts a plurality of frames denoted as frames F4, F5, F6 and F7 (collectively denoted as frames F). Each of the frames F is logically constructed using a plurality of time segments, illustratively five time segments. Each frame is also depicted as overlapping a sequentially adjacent frame by one temporal segment. It will be appreciated by those skilled in the art that the frames F may be constructed of more or fewer time segments, that the number of time segments overlapping may be more or fewer than one, and that other changes may be made in the logical construction of frame size, duration and the like. For purposes of clarity, a difference quantity ($\Delta$) comprises a temporal difference equal to the duration of one temporal segment. While the coordinate stream CS is depicted as having a plurality of temporal segments of equal duration, though it will be appreciated by those skilled in the art that temporal segments of differing durations may also be employed within the context of the present invention.

Each of the temporal segments is logically constructed to contain a plurality of adjacent vector coordinates. Each of the frames F is logically constructed to contain a plurality of adjacent temporal segments. Those vector coordinates contained by a frame are intended to be presented on a display device as part of a corresponding image. By selectively displaying each frame in a sequence of frames (e.g., frame F4, then frame F5, then frame F6, then frame F7 and so on), the resulting presentation on the display device comprises a temporally constrained portion of the vector coordinates forming the coordinate stream CS. In this manner, a viewer or user attempting to discern features or characteristics associated with the underlying signal under test may concentrate on specific temporal regions of the coordinate stream and thereby more clearly interpret the data necessary to the viewer or user's purpose.

Figure 5:
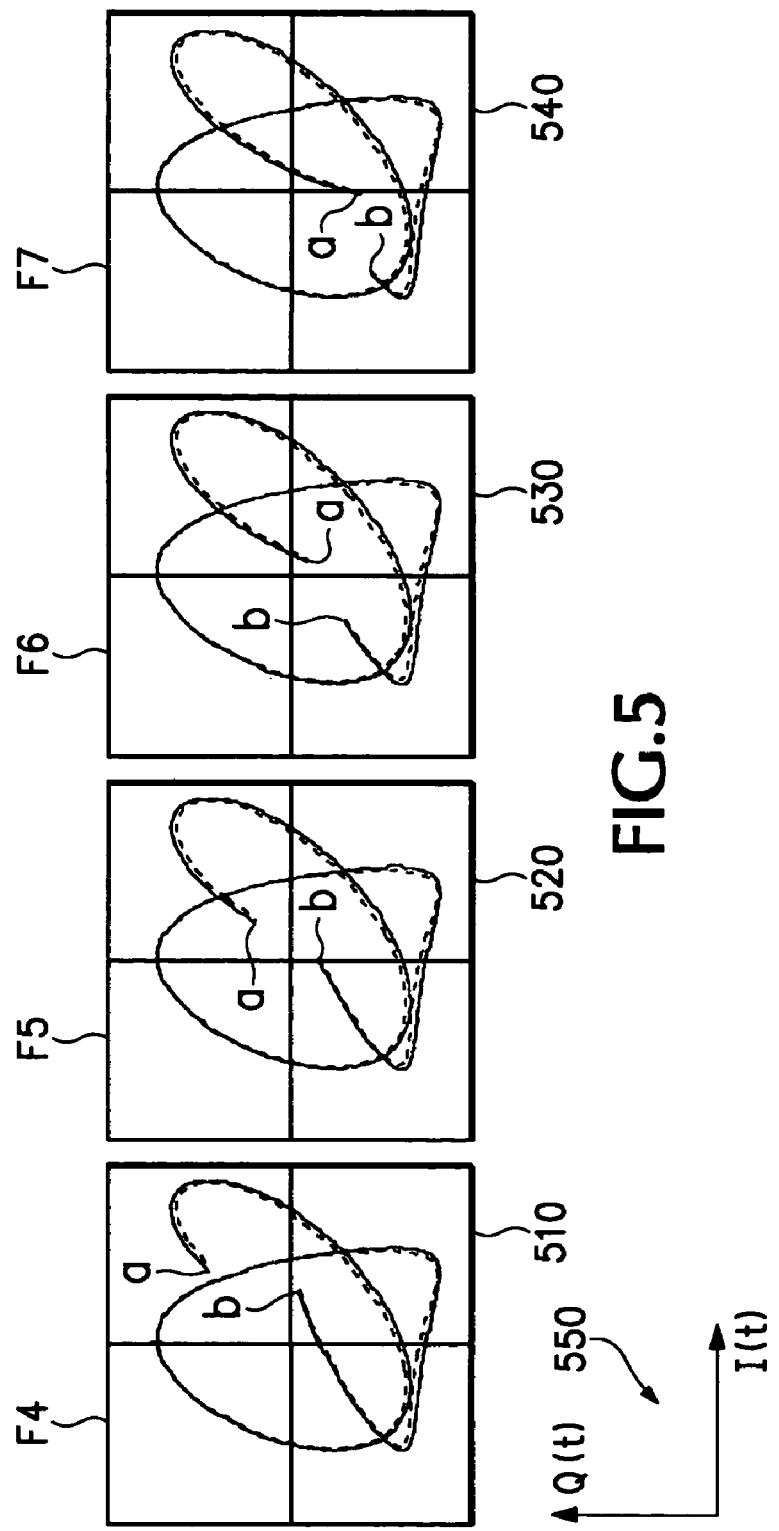
FIG. 5 graphically depicts a plurality of image frames.

FIG. 5 graphically depicts a plurality of image frames. Specifically, FIG. 5 denotes exemplary imagery associated with each of the frames F4–F7 discussed above with respect to FIG. 4. Each of the images 510, 520, 530 and 540 depicted in FIG. 5 (i.e., those associated with, respectively, frames F4–F7) depicts a respective frame in a temporally aligned sequence of frames presenting on a display device vector coordinates from the coordinate stream CS of FIG. 4. As previously discussed, the frames temporally overlap such that adjacent frames include common coordinate points. However, as a sequence of frames is displayed in a temporally advancing manner, the temporally older coordinate points are not displayed in subsequent frames, while temporally newer coordinate points are initially displayed in subsequent frames.

In the sequence of frames depicted in FIG. 5, each frame has associated with it a vector plot comprising "actual" (e.g., measured) data S(t) and reference data R(t) used to form the displayed waveform. In addition, the displayed waveform has a coordinate comprising the most recent temporal coordinate (denoted as (a)) and a coordinate comprising the least recent or oldest displayed coordinate (denoted as (b)). It can be seen that the newest coordinate (a) "advances" over time from frame F4 through frame F7, while the oldest coordinate (b) "retreats" over time from frames F4 through frame F7. Thus, the sequence of frames depicted in FIG. 5 are time-banded by a temporal difference represented by the most recent coordinate (a) and the oldest coordinate (b).

Depending upon the complexity of the signal under test to be viewed, the amount of information displayed within one frame may be increased or decreased. Such increase or decrease may be effected by, for example, increasing or decreasing the number of coordinates within each time segment, or increasing or decreasing the number of time segments within each frame. Additionally, the "persistence" characteristic of the waveform display may be increased or decreased by adapting the number of temporal segments overlapping between adjacent frames.

The imagery discussed above with respect to FIGS. 4–5 may be captured and displayed on a measurement device such as a digital storage oscilloscope (DSO) or computer. Advantageously, the imagery 510 provides rapid assessment of complex signal density within regions of interest, such as specific constellation points depicted. It will be appreciated that more or fewer than eight constellation points may be depicted, depending upon the type of modulation employed to produce the signal under test processed according to the teachings of the present invention. The inventors contemplate that the subject invention may be adapted to many different modulation techniques and many different parameter combinations. Moreover, a user input may be received that selects one or more displayed signal coordinates such that numeric (or other) parameters of the selected coordinate(s) are also displayed.

Figure 6:
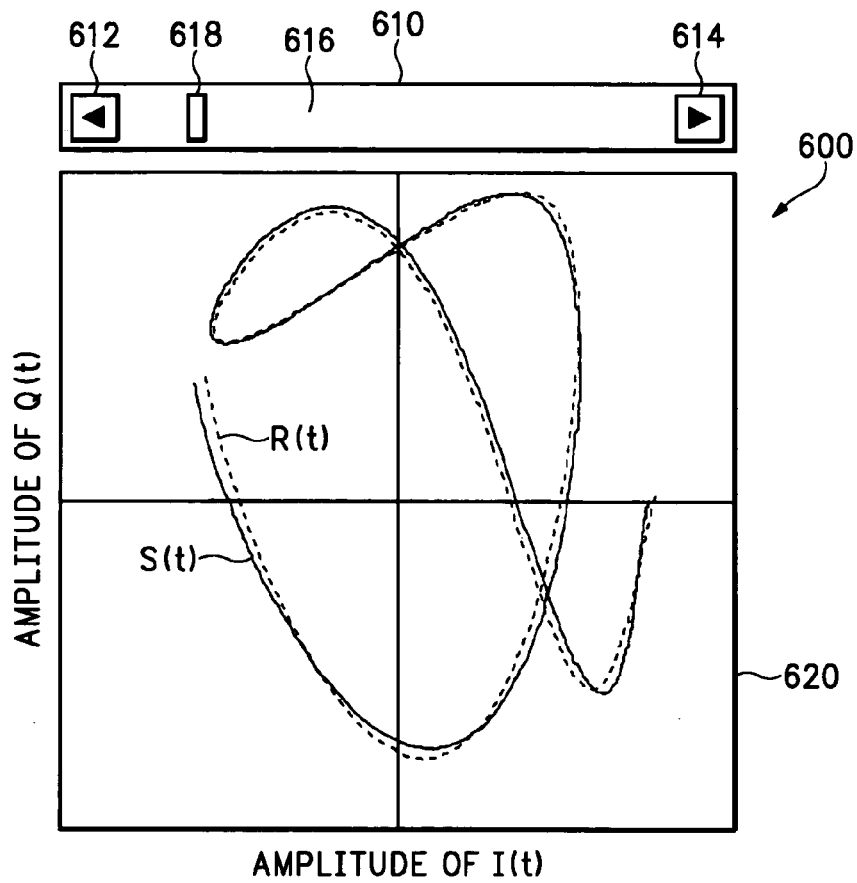
FIG. 6 depicts a user interface adapted to presenting image frames such as shown in FIG. 5.

FIG. 6 depicts a user interface adapted to presenting image frames such as shown in FIG. 5. Specifically, the user interface 600 of FIG. 6 comprises a display region 620 having presented therein a first waveform S(t) generated using polar coordinates provided by, for example, the coordinate stream CS discussed above with respect to FIGS. 4 and 5. Additionally, an optional reference waveform R(t) is presented in the display region 620. The optional reference waveform R(t) is generated by, for example, the processor 150 of the measuring system 10 of FIG. 1. The reference waveform R(t) comprises a waveform representing an ideal or desired waveform to which the actual or measured waveform S(t) should conform. Deviations between the reference waveform R(t) and actual waveform S(t) comprise errors or deviations that are useful in understanding the operation of a device or function producing the initial signal under test.

The display region 600 displays imagery associated with a single frame within a sequence of frames, such as discussed above with respect to FIGS. 4 and 5. The user interface 600 facilitates manipulation of stored frames such that a user can perform various measurement and analysis functions. Specifically, the user interface 600 of FIG. 6 also comprises a slider bar 610 including a temporal decrement icon 612, a temporal increment icon 614, a temporal location item 618 and a temporal range region 616. The temporal advance icon 614, when selected by an input device or other control input, results in the presentation within the display region 620 of the next frame within the sequence of frames. Similarly, selection of the temporal decrement icon 612 results in the presentation of the previous frame within the sequence of frames. The relative position of the temporal position icon 618 within the region 616 indicates the relative position of the presently presented frame to the other frames forming the sequence of frames (in this case the initial frame is leftmost and the final frame is rightmost).

Figure 7:
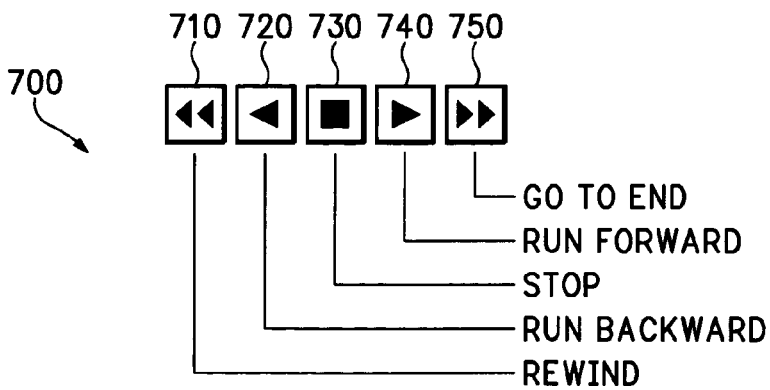
FIG. 7 graphically depicts user interface functions suitable for use in the user interface of FIG. 6.
Figure 7:
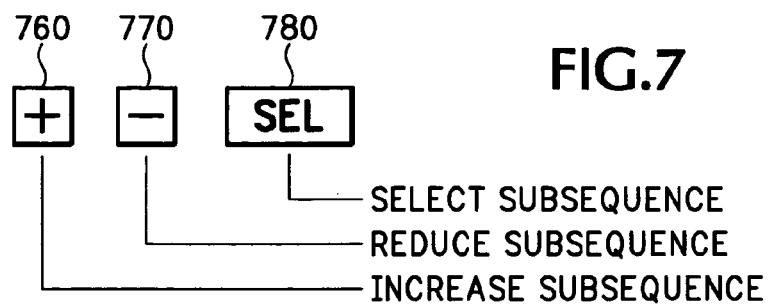

FIG. 7 graphically depicts user interface functions suitable for use in the user interface of FIG. 6. Specifically, FIG. 7 depicts additional icons or representations of functions that may be utilized within the context of a user interface, such as discussed above with respect to FIG. 6. Specifically, FIG. 7 depicts a rewind icon 710, a run backward icon 720, a stop icon 730, a run-forward icon 740, and a go-to-end icon 750. The rewind icon is associated with a function that, upon selection, results in the first frame within a sequence of frames being displayed. The run-backward icon is associated with a function that, when selected, results in the sequential display in a reverse temporal order of the frames within the sequence of frames, beginning with the presently displayed frame. The stop icon causes the continual display the presently displayed frame. The run-forward icon 740 is associated with a function that, when selected, causes the sequence of frames to be sequentially displayed beginning with the presently displayed frame. The go-to-end icon 750 is associated with a function that, when selected, causes the final frame within the sequence of frames to be displayed.

FIG. 7 also depicts several icons associated with functions adapted to modify the imagery to be displayed for each frame. Specifically, selectable icons associated with an increase sub-sequence function 760, a reduce sub-sequence function 770 and a select sub-sequence function 780 are provided. The increase sub-sequence function 760 is used to increase the number of temporal segments forming each frame (add more data to each frame). The reduce sub-sequence function 770 is used to reduce the number of temporal segments forming each frame (reduce the data in each frame). The select sub-sequence function 770 is used to enter an interactive menu whereby a specific number of temporal segments forming each frame may be selected. While not shown, additional functions may also be provided. For example, additional icons associated with the functions of increasing, reducing and/or selecting the number of vector coordinates associated with each temporal segment may also be provided.

Figure 8:
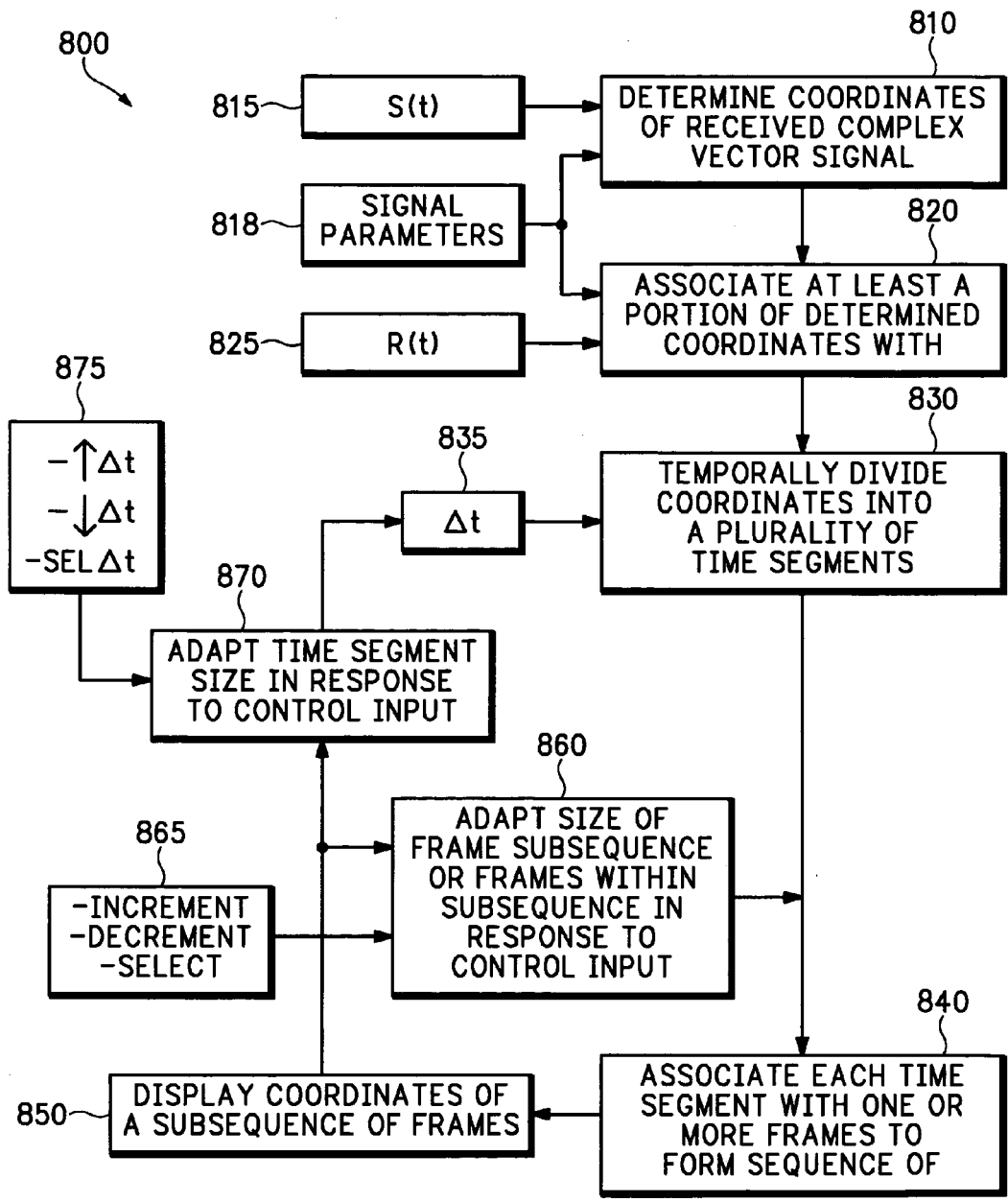
FIG. 8 depicts a flow diagram of a method according to an embodiment of the invention.

FIG. 8 depicts a flow diagram of a method according to an embodiment of the invention. Specifically, FIG. 8 depicts a flow diagram of a method for controllably displaying complex vector signal data and, optionally, corresponding reference signal data in a time-constrained manner.

The method 800 of FIG. 8 is entered at step 810 where coordinates of the received complex vector signal are determined. This determination may be made by the controller 150 using samples stored in the acquisition memory 140 in the measurement system 10 of FIG. 1. The coordinates determined at step 810 represent an actual waveform S(t), such as noted in box 815. Determination of the coordinates optionally depends on a supplied set of signal parameters, such as carrier frequency, symbol rate, filter shape and bandwidth, or modulation type, such as noted in box 818. It is also noted that the coordinates may comprise Cartesian coordinates, polar coordinates or other coordinates useful in performing the measurement task desired.

At step 820, at least a portion of the determined coordinates of step 810 are associated with corresponding reference coordinates. The reference coordinates are those coordinates associated with an ideal or desired waveform R(t), as denoted by box 825. The reference coordinates optionally depend on the supplied set of signal parameters of box 818.

At step 830, the sequence of determined coordinates from steps 810 and, optionally, step 820, are temporally divided into a plurality of time segments. Each time segment may have a fixed or variable duration Δt, as noted in box 835 and previously discussed.

At step 840, each time segment is associated with at least one frame to form a sequence of temporally overlapping frames, as previously discussed.

At step 850, the vector coordinates and, optionally, reference coordinates, of each frame within a sub-sequence of frames are presented on a display device, such as discussed above with respect to FIGS. 4–6. It is noted that one frame at a time may be displayed such that user manipulation may cause a frame increment or frame decrement within the sequence of frames. The frames may also be displayed at a predefined rate, such as a slow motion, fast motion or actual motion display rate as compared with the underlying signal under test.

At optional step 860, the size of frame sub-sequence or frames within the sub-sequence is adapted in response to control input. That is, as previously discussed with respect to FIG. 7, and noted in box 865, the number of temporal segments within each frame may be incremented, decremented, selected or otherwise determined.

At optional step 870, the size of the time segment or number of vector coordinates contained within a time segment is adapted in response to control input. That is, as previously discussed with respect to FIG. 7, the size of a time segment may be increased, decreased, selected or otherwise determined.

The above-described method may be used to process real-time data or process previously stored data. Moreover, the processing steps discussed herein may be performed in a different order, continuously and/or in parallel. For example, in one embodiment of the invention, memory within the signal measuring device 10 is used to store a plurality of digitized samples associated with a specific triggered event. The stored digitized samples are then processed to produce a plurality of complex vector data points, such as depicted above in the coordinate stream CS of FIG. 4. In this embodiment, complex vectors associated with a finite amount of time are stored and subsequently processed and/or viewed to enable analysis of the underlying signal under test. In a near real-time embodiment, memory within the signal measuring device 10 is increasingly utilized since data is being acquired faster than the data is being presented and subsequently discarded. In this embodiment, the memory within the signal measuring device 10 operates as a buffer that eventually constrains the imagery viewed by a user.

In another embodiment of the invention, the signals S(t) and R(t) from boxes 815 and 825 may be two simultaneously-acquired signals, such as the input and output of a device, or the outputs of a device under test and a reference device. One or both of such signals may also be delayed in time to align relevant signal portions.

The reference signal may be used to delineate a reference coordinate(s) or coordinate(s) range(s). The reference signal may also be derived from ideal or expected reference coordinate(s) range(s) stored in a memory. A combination of stored and received (i.e., derived) reference coordinate(s) or coordinate range(s) may also be used.

The above-described invention operates to display vector coordinates associated with a signal under test in a time-constrained manner such that a display remains visually uncluttered and, therefore, a user or a viewer of that display may derive useful information about a signal under test. Optionally, reference vector coordinates may also be displayed contemporaneously with the underlying actual vector coordinates such that deviations between actual and reference coordinates may be readily appreciated by the viewer or user. In various embodiments, the amount of data to be displayed at one time may be modified by adapting the number of coordinates contained within a time segment, the number of time segments contained within a frame, the amount by which adjacent frames overlap and/or other techniques discussed above and appreciated by those skilled in the art informed by the teachings of the present invention.

Although various embodiments which incorporate the teachings of the present invention have been shown and described in detail herein, those skilled in the art can readily devise many other varied embodiments that still incorporate these teachings.

What is claimed is:

1. An oscilloscope, comprising:
    a digitizer receiving an input signal representing a complex vector waveform (S(t) including quadrature Q(t) and in-phase I(t) components and providing digital data samples at an output;
    a memory coupled to said digitizer and receiving and storing said digital data samples;
    a controller reading said samples and processing said samples for display on a display screen;
    said controller causing a polar display of said quadrature Q(t) and said in-phase I(t) components of said waveform S(t) to be limited to a predetermined time span T(x+n)–T(x), shorter than a total time span T of waveform S(t), such that trajectories of later drawn vectors of said components do not overlay and obscure trajectories of earlier-drawn vectors of said components.

2. The oscilloscope of claim 1, wherein:
    said waveform S(t) is divided into a plurality of temporally overlapping segments F(n) having a length equal to said predetermined time span T(x+n)–T(x).

3. The oscilloscope of claim 2, wherein:
    in response to user control, each of said plurality of temporally overlapping segments F(n) is drawn in sequence on said display screen, and when each segment is drawn, the earlier drawn sequence is removed form the display.

4. The oscilloscope of claim 2, further including:
    a user-operable control receiving input from a user and in response thereto causing said processor to display each of said plurality of temporally overlapping segments F(n) in sequence on said display screen.

5. The oscilloscope of claim 2, further including:

a user-operable control receiving input from a user and in response thereto causing said controller to display each of said plurality of temporally overlapping segments F(n) in one of a forward sequence or a reverse sequence on said display screen.

6. The oscilloscope of claim 5, wherein:

said user-operable control includes user-operable portions which when activated by a user cause one of a Go To Beginning, Play, Stop, Reverse, and Go To End modes of operation of displaying said temporally overlapping segments F(n).

7. The oscilloscope of claim 6, wherein:

a. said display screen is a touch screen display screen and said user-operable portions of said user-operable control include a plurality of icons displayed on said display screen, said user touching a desired one of said icons to utilize one of said modes of operation.

8. An oscilloscope, comprising:

a digitizer receiving an input an analog signal representing complex vector waveform (S(t) including quadrature Q(t) and in-phase I(t) components and providing digital data samples at an output;

a first memory coupled to said digitizer, said first memory receiving and storing said digital data samples;

a second memory storing data representing a reference waveform signal R(t) having quadrature and in-phase components;

a controller reading said digital data samples and processing said digital data samples for display on a display screen;

said controller also reading said stored data representing said reference waveform signal R(t) having quadrature and in-phase components for display on said display screen;

said controller causing a polar display of said quadrature Q(t) and said in-phase I(t) components of said waveforms S(t) and R(t) to be limited to a predetermined time span T(x+n)−T(x), shorter than a total time span T of waveform S(t), such that trajectories of later drawn vectors of said components do not overlay and obscure trajectories of earlier-drawn vectors of said components.

9. The oscilloscope of claim 8, wherein:

said waveforms S(t) and R(t) are divided into a plurality of temporally overlapping segments F(n) having a length equal to said predetermined time span T(x+n)−T(x).

10. The oscilloscope of claim 9, wherein:

in response to user control, each of said plurality of temporally overlapping segments F(n) is drawn in sequence on said display screen, and when each segment is drawn, the earlier drawn sequence is removed form the display.

11. The oscilloscope of claim 9, further including:

a user-operable control receiving input from a user and in response thereto causing said controller to display each of said plurality of temporally overlapping segments F(n) in sequence on said display screen.

12. The oscilloscope of claim 9, further including:

a user-operable control receiving input from a user and in response thereto causing said controller to display each of said plurality of temporally overlapping segments F(n) in one of a forward sequence or a reverse sequence on said display screen.

13. The oscilloscope of claim 9, wherein:

said user-operable control includes user-operable portions which when activated by a user cause one of a Go To Beginning, Play, Stop, Reverse, and Go To End modes of operation of displaying said temporally overlapping segments F(n).

14. The oscilloscope of claim 13, wherein:

said display screen is a touch screen display screen and said user-operable portions of said user-operable control include a plurality of icons displayed on said display screen, said user touching a desired one of said icons to utilize one of said modes of operation.

* * * * *